(12) United States Patent
Spence et al.

(10) Patent No.: US 9,656,189 B2
(45) Date of Patent: May 23, 2017

(54) CENTRIFUGE PROCESS FOR DEWATERING OIL SANDS TAILINGS

(75) Inventors: Jonathan Spence, Edmonton (CA); Barry Bara, Edmonton (CA); Jim Lorentz, Fort McMurray (CA); Randy Mikula, Edmonton (CA); Jiwon Lee, Fort McMurray (CA); Richard Daniel Lahaie, Canmore (CA)

(73) Assignee: SYNCRUDE CANADA LTD., Fort McMurray (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 13/594,402

(22) Filed: Aug. 24, 2012

(65) Prior Publication Data

US 2014/0054231 A1 Feb. 27, 2014

(51) Int. Cl.

| C10G 1/04 | (2006.01) |
|---|---|
| B01D 21/01 | (2006.01) |
| C02F 1/52 | (2006.01) |
| B01D 21/26 | (2006.01) |
| C02F 1/38 | (2006.01) |
| C02F 1/56 | (2006.01) |
| B01D 21/00 | (2006.01) |
| C02F 1/00 | (2006.01) |
| C02F 9/00 | (2006.01) |
| B01D 33/15 | (2006.01) |

(Continued)

(52) U.S. Cl.
CPC .......... *B01D 21/01* (2013.01); *B01D 21/262* (2013.01); *C02F 1/38* (2013.01); *C02F 1/385* (2013.01); *C02F 1/5236* (2013.01); *C02F 1/56* (2013.01); *C10G 1/04* (2013.01); *B01D 2221/04* (2013.01); *C02F 2103/10* (2013.01)

(58) Field of Classification Search
None
See application file for complete search history.

(56) References Cited

U.S. PATENT DOCUMENTS

| 3,723,310 A * | 3/1973 | Lang et al. ................... 210/727 |
| 5,449,464 A * | 9/1995 | El-Shall ...................... 210/727 |
| 5,935,425 A * | 8/1999 | Sortwell ....................... 210/87 |

(Continued)

FOREIGN PATENT DOCUMENTS

| CA | 2735640 | 10/2012 |
| CA | 2787607 A1 | 2/2014 |

(Continued)

OTHER PUBLICATIONS

Downing et al., Campbell Scientific Application Note, "Comparison of Suspended Solids Concentration and Turbidity", 2008, pp. 1-3.*

(Continued)

*Primary Examiner* — Clare Perrin
(74) *Attorney, Agent, or Firm* — Bennett Jones LLP

(57) ABSTRACT

A process for dewatering oil sands tailings is provided, comprising providing a tailings feed having a solids content in the range of about 10 wt % to about 45 wt %; adding a flocculant to the tailings feed and mixing the tailings feed and flocculant to form flocs; and centrifuging the flocculated tailings feed to produce a centrate having a solids content of less than about 3 wt % and a cake having a solids content of at least about 50 wt %.

31 Claims, 11 Drawing Sheets

(51) Int. Cl.
  *B01D 12/00* (2006.01)
  *C02F 103/10* (2006.01)

(56) References Cited

U.S. PATENT DOCUMENTS

| | | | |
|---|---|---|---|
| 2004/0035800 A1* | 2/2004 | Weir | 210/723 |
| 2008/0035577 A1* | 2/2008 | Brook-Levinson et al. | 210/667 |
| 2008/0099380 A1* | 5/2008 | Lahaie | C10G 1/047 208/424 |
| 2009/0020458 A1* | 1/2009 | Bozak et al. | 208/390 |
| 2010/0038314 A1* | 2/2010 | Vion et al. | 210/638 |
| 2010/0101981 A1* | 4/2010 | Moffett | C04B 28/24 208/391 |
| 2011/0036272 A1* | 2/2011 | Esmaeili | C04B 18/0481 106/705 |
| 2011/0094970 A1* | 4/2011 | Kincaid et al. | 210/726 |
| 2011/0147316 A1* | 6/2011 | Polizzotti et al. | 210/705 |
| 2012/0248042 A1* | 10/2012 | Baldrey et al. | 210/710 |

FOREIGN PATENT DOCUMENTS

| | | | | |
|---|---|---|---|---|
| WO | WO 0192167 A1 * | 6/2001 | | |
| WO | WO0192167 A1 * | 12/2001 | | C02F 11/00 |
| WO | WO 2012088291 A1 * | 6/2012 | | C04B 33/04 |

OTHER PUBLICATIONS

Mikula, et al., "Centrifuge options for production of "Dry stackable tailings" in surface mined oil sands tailings management", Canadian International Petroleum Conference Paper, 2008, pp. 1-8.*
Wells et al. ("MFT Drying—Case Study in the Use of Rheological Modification and Dewatering of Fine Tailings Through Thin Lift Deposition in the Oil Sands of Alberta", Tenth International Seminar on Paste and Thickened Tailings, Mar. 2007, pp. 271-284).*
Wang et al. (Mining Science and Technology, Taylor & Francis Group, London, UK, 2004, pp. 655-656.*
Coleman, P.W. and Adams, R.B., Study and Demonstration of a Process to Extract Bitumen from a Utah Tar Sand, Proceedings of the SPE International Thermal Operations and Heavy Oil Symposium, Mar. 2004, Paper #86945, Bakersfield US.
Mikula, R.J., Munoz, V.A. and Omotoso, O., Laboratory and Pilot Experience in the Development of a Conventional Water Based Extraction Process for the Utah Asphalt Ridge Tar Sands, Proceedings of the Canadian International Pertoleum Society, Jun. 2006, Paper #06-131, Calgary CA.
Devenny, D.W., Corti, A., Paul, R., Dereniwski, T., Claridge, F.B., Taplin, D., and Johnson, G., Induced Consolidation to Solidify Oil Sand Sludge, Proceedings: 44th Canadian Geotechnical Conference, 1991, Calgary CA.
Mikula, R.J., Munoz, V.A., and Omotoso, O., Centrifuge Options for the Production of Dry Stackable Tailings in Surface Mined Oil Sands Tailings Management, Proceedings of the Canadian International Petroleum Society, Jun. 2008, Paper #08-096, Calgary CA.
Mikula, R.J., Dang-Vu, T., Omotoso, O., and Lahaie, R., Dry Stackable Tailings as a Tailings Management Option: Preliminary Laboratory and Field Experience Using Centrifuges, Proceedings of the Canadian International Petroleum Society, Jun. 2009, Paper #09-167, Calgary CA.
Mikula, R.J., Dang-Vu, T., Omotoso, O., and Lahaie, R., Dry Stackable Tailings in Surface Mined Oil Sands: Preliminary Laboratory and Field Experience Using Centrifuges, Proceedings of the World Heavy Oil Conference, 2009, Paper #2009-372, Puerto La Cruz VE.
Lahaie, R., New Tailings Concepts, Proceedings of the International Oil Sands Tailings Conference, Dec. 2008, Edmonton CA.
Mikula, R.J., Munoz, V.A., and Omotoso, O., Laboratory and Pilot Experience for a Conventional Water Based Extraction Process for the Utah Asphalt Ridge Tar Sands, Proceedings of the World Heavy Oil Conference, 2006, Paper #2006-712, Devon CA.

* cited by examiner

CENTRIFUGE PROCESS FOR DEWATERING OIL SANDS TAILINGS

FIELD OF THE INVENTION

The present invention relates to a process for dewatering oil sands tailings. In particular, tailings are treated with a coagulant and a flocculant and subjected to centrifugation to form a suitable cake for disposal and/or further environmental desiccation.

BACKGROUND OF THE INVENTION

Oil sand generally comprises water-wet sand grains held together by a matrix of viscous heavy oil or bitumen. Bitumen is a complex and viscous mixture of large or heavy hydrocarbon molecules which contain a significant amount of sulfur, nitrogen and oxygen. The extraction of bitumen from sand using hot water processes yields large volumes of fine tailings composed of fine silts, clays, residual bitumen and water. Mineral fractions with a particle diameter less than 44 microns are referred to as "fines." These fines are typically clay mineral suspensions, predominantly kaolinite and illite.

The fine tailings suspension is typically 85% water and 15% fine particles by mass. Dewatering of fine tailings occurs very slowly. When first discharged in ponds, the very low density material is referred to as thin fine tailings. After a few years when the fine tailings have reached a solids content of about 30-35%, they are referred to as fluid fine tailings which behave as a fluid-like colloidal material. The fact that fluid fine tailings behave as a fluid and have very slow consolidation rates significantly limits options to reclaim tailings ponds. A challenge facing the industry remains the removal of water from the fluid fine tailings to strengthen the deposits so that they can be reclaimed and no longer require containment.

Accordingly, there is a need for an improved method to treat fine tailings to reduce their water content and reclaim the land on which fine tailings are disposed.

SUMMARY OF THE INVENTION

The current application is directed to a process for dewatering oil sands tailings by treating the tailings with coagulant and flocculant prior to dewatering by centrifugation. The present invention is particularly useful with, but not limited to, fluid fine tailings. It was surprisingly discovered that by conducting the process of the present invention, one or more of the following benefits may be realized:

(1) providing a concentrated flocculant solution may reduce the volume of high quality flocculant make up water which would normally be required, and corresponds with higher throughput;

(2) the flocculant may be mixed with tailings having a solids content of greater than 30 wt %, thus minimizing the requirement for tailings dilution;

(3) optimum mixing of the flocculant and tailings may be achieved by injecting the flocculant at a point directly before the centrifuge feed tube to avoid overshearing;

(4) dewatering by centrifugation may produce a centrate having a solids content of less than about 3 wt %, and a cake having a solids content of at least about 50 wt % and capturing greater than 95% of the solids within the initial tailings;

(5) ultrafines separation does not occur with flocculated centrifuge feed. Surprisingly, the particle size distribution did not differ among the centrifuge feed, cake and centrate;

(6) it was surprisingly discovered that the process worked at ambient temperature; and (7) the optional addition of a coagulant may result in higher throughput and produce a significantly stronger, more conveyable cake from the centrifuge.

Thus, use of the present invention enables reclamation of tailings disposal areas and recovers water suitable for recycling in the process.

In one aspect, a process for dewatering oil sands tailings is provided, comprising:
providing a tailings feed having a solids content in the range of about 10 wt % to about 45 wt %;
adding a flocculant to the tailings feed and mixing the flocculant and tailings feed to form flocs; and
centrifuging the flocculated feed to produce a centrate having a solids content of less than about 3 wt % and a cake having a solids content of at least about 50 wt %.

In one embodiment, a coagulant is added to the tailings feed prior to centrifugation. In another embodiment, a coagulant is added to the tailings feed prior to the addition of the flocculant.

In one embodiment, the oil sands tailings is fluid fine tailings, which fluid find tailings may be optionally diluted with water to provide the tailings feed having a solids content in the range of about 10 wt % to about 45 wt %. In another embodiment, the tailings feed has a solids content in the range of about 30 wt % to about 45 wt %.

In one embodiment, the flocculant is a water soluble polymer having a moderate to high molecular weight and an intrinsic viscosity of at least 3 dl/g (measured in 1N NaCl at 25° C.).

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE PREFERRED EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates generally to a process for treating tailings derived from oil sands extraction operations and containing a fines fraction, and dewatering the tailings to enable reclamation of tailings disposal areas and to recover water for recycling. As used herein, the term "tailings" means tailings derived from oil sands extraction operations and containing a fines fraction. The term is meant to include fluid fine tailings (FFT) from tailings ponds and fine tailings from ongoing extraction operations (for example, thickener underflow or froth treatment tailings) which may bypass a tailings pond. The tailings are treated with coagulant and flocculant prior to dewatering by centrifugation to aggregate the solids and to recover the water.

Figure 1:
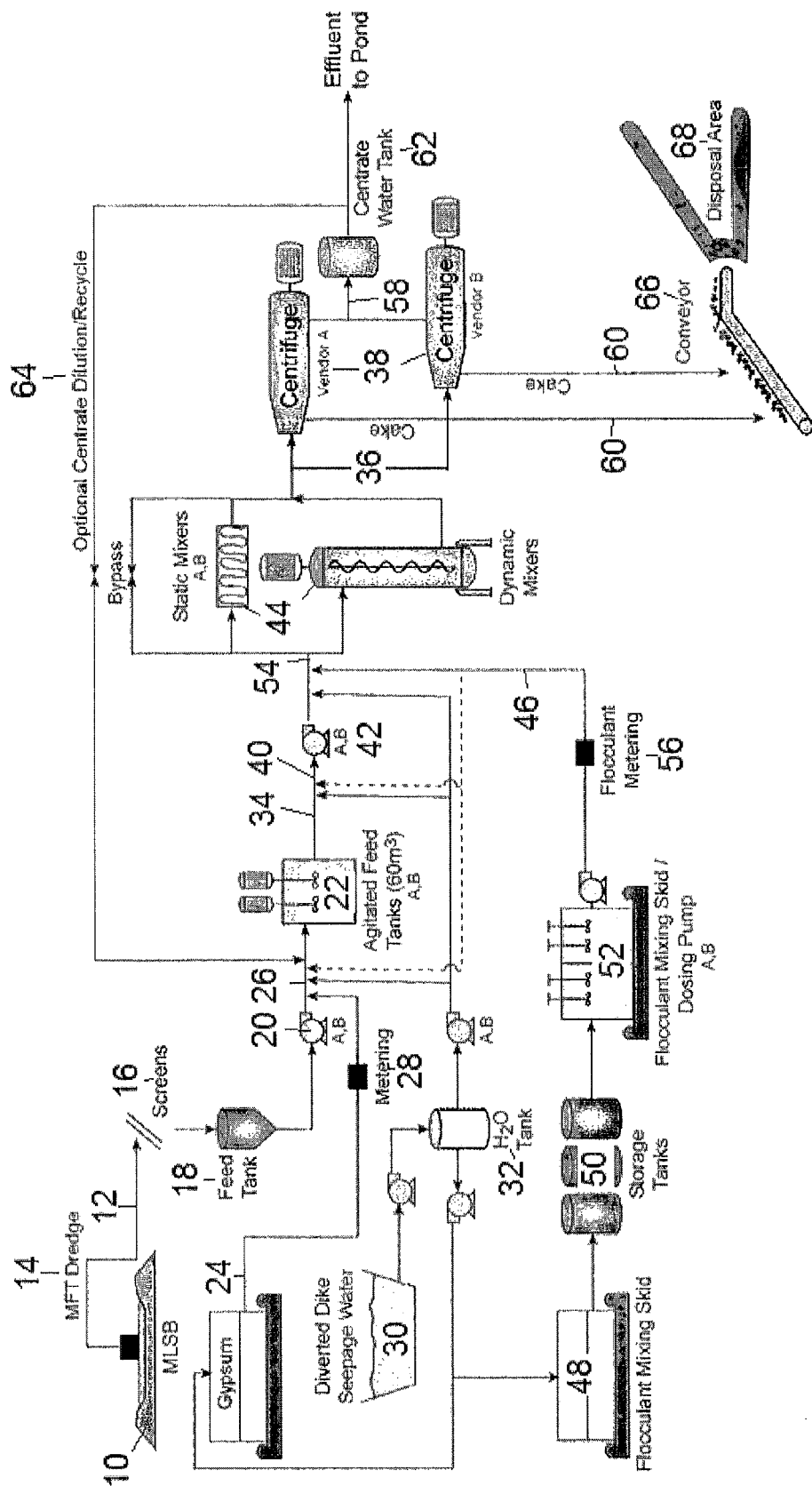
FIG. 1 is a schematic of one embodiment of the present invention for treating oil sands tailings prior to dewatering by centrifugation.

FIG. 1 is a flow diagram of the process of the present invention. In one embodiment, the tailings are primarily FFT obtained from tailings ponds. However, it should be understood that the fine tailings treated according the process of the present invention are not necessarily obtained from a tailings pond and may also be obtained from ongoing oil sands extraction operations.

The tailings stream from bitumen extraction is typically transferred to a tailings pond 10 where the tailings stream separates into an upper water layer, a middle FFT layer, and a bottom layer of settled solids. The FFT layer 12 is removed from between the water layer and solids layer via a dredge 14 or floating barge having a submersible pump. In one embodiment, the FFT 12 has a solids content ranging from about 10 wt % to about 45 wt %. In another embodiment, the FFT 12 has a solids content ranging from about 30 wt % to about 45 wt %. In one embodiment, the FFT 12 has a solids content ranging from about 37 wt % to about 40 wt %. The FFT 12 is preferably undiluted. The FFT is passed through a screen 16 to remove any oversized materials. The screened FFT 12 is collected in a vessel such as a tank 18. In one embodiment the FFT 12 is then pumped via a pump 20 from the tank 18 into an agitated feed tank 22 comprising a tank body and blades. In another embodiment FFT is pumped to a simple surge tank, and in yet another embodiment FFT is pumped directly to the centrifuge.

A coagulant 24 is introduced into the in-line flow of FFT prior to entering the agitated feed tank 22. In one embodiment, coagulant 24 is introduced into the in-line flow of FFT prior to entering the centrifuge 38. As used herein, the term "coagulant" refers to a reagent which neutralizes repulsive electrical charges surrounding particles to destabilize suspended solids and to cause the solids to agglomerate. Suitable coagulants include, but are not limited to, gypsum, lime, alum, polyacrylamide, or any combination thereof. In one embodiment, the coagulant comprises gypsum or lime. As used herein, the term "in-line flow" means a flow contained within a continuous fluid transportation line such as a pipe or another fluid transport structure which preferably has an enclosed tubular construction. Sufficient coagulant 24 is added at line 26 to initiate neutralization. The dosage of the coagulant 24 is controlled by a metering pump 28. In one embodiment, the dosage of the coagulant 24 ranges from about 300 grams to about 1,500 grams per tonne of solids in the FFT.

Dilution water 30 is required to disperse the coagulant 24 into the forward flow of the FFT 12 and to minimize the risk of total coagulation which would entrap the solids within the line 26. The dilution water 30 is introduced into the in-line flow of the FFT at line 26 prior to entering the agitated feed tank 22. The source of water 30 is preferably any low solids content process affected water. The FFT 12 and diluted coagulant 24 are blended together within the agitated feed tank 22, or in the pipeline when no feed tank is used. Agitation is conducted for a sufficient duration in order to allow the coagulant 24 to dissociate from the water 30 and agglomerate the FFT 12. In one embodiment, the duration is at least about five minutes.

The agitated FFT 34 is then diluted with water 30. The water 30 is introduced into the in-line flow of the agitated FFT 34 prior to entering a mixer 44. As previously mentioned, the source of water 30 is preferably any low solids content process affected water. Sufficient water 30 is added to achieve a centrifuge feed 36 having a solids content preferably in the range of about 18 wt % to about 36 wt %, preferably greater than about 30 wt %. Dilution provides a consistent feed 36 to the centrifuge 38 to ensure stable machine operation. In one embodiment, the diluted FFT 40 is pumped via a pump 42 from the agitated feed tank 22 into the mixer 44. In another embodiment FFT is piped directly to the mixer 44.

Additional water 30 and a flocculant 46 are introduced into the in-line flow of the diluted FFT 40 at a line 54 prior to entering the mixer 44. As used herein, the term "flocculant" refers to a reagent which bridges the neutralized or coagulated particles into larger agglomerates, resulting in more efficient settling. Flocculants useful in the present invention are generally anionic, nonionic, cationic or amphoteric polymers, which may be naturally occurring or synthetic, having relatively high molecular weights. Preferably, the polymeric flocculants are characterized by molecular weights ranging between about 1,000 kD to about 50,000 kD. Suitable natural polymeric flocculants may be polysaccharides such as dextran, starch or guar gum. Suitable synthetic polymeric flocculants include, but are not limited to, charged or uncharged polyacrylamides, for example, a high molecular weight polyacrylamide-sodium polyacrylate co-polymer.

Other useful polymeric flocculants can be made by the polymerization of (meth)acryamide, N-vinyl pyrrolidone, N-vinyl formamide, N,N dimethylacrylamide, N-vinyl acetamide, N-vinylpyridine, N-vinylimidazole, isopropyl acrylamide and polyethylene glycol methacrylate, and one or more anionic monomer(s) such as acrylic acid, methacrylic acid, 2-acrylamido-2-methylpropane sulphonic acid (ATBS) and salts thereof, or one or more cationic monomer(s) such as dimethylaminoethyl acrylate (ADAME), dimethylaminoethyl methacrylate (MADAME), dimethydiallylammonium chloride (DADMAC), acrylamido propyltrimethyl ammonium chloride (APTAC) and/or methacrylamido propyltrimethyl ammonium chloride (MAPTAC).

In one embodiment, the flocculant 46 comprises an aqueous solution of an anionic polyacrylamide. The anionic polyacrylamide preferably has a relatively high molecular weight (about 10,000 kD or higher) and medium charge density (about 20-35% anionicity), for example, a high molecular weight polyacrylamide-sodium polyacrylate copolymer. The preferred flocculant may be selected according to the FFT composition and process conditions.

The flocculant 46 is supplied from a flocculant make up system for preparing, hydrating and dosing of the flocculant 46. Flocculant make-up systems are well known in the art, and typically include a polymer preparation skid 48, one or more storage tanks 50, and a dosing pump 52. The dosage of flocculant 46 is controlled by a metering pump 56. In one embodiment, the dosage of flocculant 46 ranges from about 400 grams to about 1,500 grams per tonne of solids in the FFT. In one embodiment, the flocculant is in the form of a 0.4% solution.

The additional water 30 is provided to disperse the flocculant 46 into the forward flow of the diluted FFT 40 and to minimize the risk of total flocculation which would entrap the solids within the line 54. When the flocculent 46 contacts the diluted FFT 40, it starts to react to form flocs formed of multiple chain structures and FFT minerals. The diluted FFT 40 and diluted flocculant 46 are further combined within the mixer 44. Since flocculated material is shear-sensitive, it must be mixed in a manner so as to avoid overshearing. Over-shearing is a condition in which additional energy has been input into the flocculated FFT, resulting in release and re-suspension of the fines within the water. Suitable mixers 44 include, but are not limited to, T mixers, static mixers, dynamic mixers, and continuous-flow stirred-tank reactors. Preferably, the mixer 44 is a T mixer positioned before the feed tube (not shown) of the centrifuge 38. In one embodiment, diluted flocculant 46 may bypass the mixer (44) and be fed directly to the feed line of the centrifuge 38 for addition to the diluted FFT 40.

Flocculation produces a suitable feed 36 which can be dewatered in the centrifuge 38. The feed 36 is transferred to the centrifuge 38 for dewatering. In one embodiment, the centrifuge 38 is a solid bowl decanter centrifuge. Solid bowl decanter centrifuges are capable of dewatering materials which are too fine for effective dewatering by screen bowl centrifuges. Extraction of centrate 58 occurs in the cylindrical part of the bowl, while dewatering of solids by compression of the cake 60 takes place in the conical part of the bowl. Separation of the centrate 58 and cake 60 using a solid bowl decanter centrifuge may be optimally achieved using low beach angle, deep pool depths, high scroll differential speed, and high bowl speed rpm.

In one embodiment, the centrate 58 has a solids content of less than about 3 wt %. The centrate 58 may be collected into a tank 62 and either discharged back to the tailings pond 10, or diverted into a line 64 for recycling for flocculant make-up or feed dilution.

In one embodiment, the cake 60 has a solids content of at least about 50 wt %. The cake 60 may be collected and transported via a conveyor 66, pump or transport truck to a disposal area 68. At the disposal area 68, the cake 60 is stacked to maximize dewatering by natural processes including consolidation, desiccation and freeze thaw via 1 to 2 m thick annual lifts to deliver a trafficable surface that can be reclaimed. In another embodiment, cake can be placed in deep pits where dewatering includes desiccation and freeze thaw, but primarily consolidation. In another embodiment, cake is placed at the bottom of End Pit Lakes.

Exemplary embodiments of the present invention are described in the following Example, which is set forth to aid in the understanding of the invention, and should not be construed to limit in any way the scope of the invention as defined in the claims which follow thereafter.

Example 1

FFT was obtained from an oil sand tailings settling basin using a Royal Boskalis Westminster type IHC 1500 cutter suction dredger capable of pumping 1900 m$^3$/hr of FFT and obtaining FFT from levels as deep as 11 meters down in the pond. Dredged FFT was pumped to the testing site, and screened through a ¾×¾ inch fixed screen prior to entering the feed tank. The FFT supply system was run continuously.

A water supply system was included to provide process affected water and environmental run-off water from a series of ponds at the base of the dike. The chemistry of the water is set out in Table 1.

TABLE 1

| Cation Concentration (ppm) | | | Anion Concentration (ppm) | | | | Other | |
|---|---|---|---|---|---|---|---|---|
| Ca | Mg | Na | Cl | SO$_4$ | HCO$_3$ | CO$_3$ | pH | Ion Balance |
| 12 | 4 | 444 | 210 | 77 | 720 | 41 | 8.47 | 0.98 |

A flocculant make-up skid (SNF Floerger, France) was used to prepare a flocculant solution. 750 kg bags of polyacrylamide polymer (SNF Flopam 3338) were made up to a mother liquor concentration of 1.5% by weight and diluted to a concentration of either 0.2% or 0.4% using process affected and environmental run-off water, and stored in a 60 m$^3$ storage tank until use. In one embodiment, the flocculant is an acrylamide-acrylate copolymer. In another embodiment, the flocculant is a high molecular weight (e.g., 14-20 million) acrylamide-sodium acrylate copolymer, having approximately 25-30% charge density.

A gypsum supply system provided gypsum slurry. Agricultural grade gypsum needs about 7 minutes to dissolve properly in an FFT slurry. At feed rates in excess of 100 m$^3$/h, the 30 m$^3$ FFT storage tank provided about 20 minutes of residence time for the gypsum to go into solution. The gypsum slurry was nominally made up to 2% solids by weight, and added via a metering pump to the FFT line.

FFT was pumped from the feed tank to individual agitated feed tanks, with each tank provided with a commercially available centrifuge. In this example, an Alfa Laval Lynx 1000 was used. When used, gypsum was added to the FFT prior to each agitated feed tank. Flocculant solution was added to the feed after the agitated feed tanks. Mixing of the FFT and diluted flocculant was tested using a simple T mixer, static mixer and a continuous-flow stirred-tank reactor. Satisfactory mixing was achieved with the T mixer positioned directly before the centrifuge feed tube.

The centrifuges were operated in parallel. The Alfa Laval centrifuge was provided with two rotating assemblies, with rotating assembly #2 having shallower beach angle. The initial gear box installed on the Alfa Laval centrifuge provided a limited back drive capability, which was subsequently improved to allow more back drive capacity.

Following centrifugation, the cake was collected via a conveyor, and transferred to a single open ended discharge cell. The production rate of cake was measured from each centrifuge using bins on load cells. Cake rates were measured for key test conditions to confirm material balances. Centrate from each centrifuge was dropped into separate collection tanks, and the final centrate was pumped back to the Mildred Lake Settling Basin.

Each of the key process lines was equipped to allow sampling. Flow and density meters were installed for process control and mass balancing. Magnetic flow meters (Endress & Hauser) were used for water applications. Dual-type coriolis meters (Endress & Hauser) were used for FFT and high solids slurry applications. The density of FFT at the dredge and at the pilot was measured with nuclear density meters (Kay Ray 3680). An on-site field lab was used to conduct analyses (Table 3; AR=as required) and to collect sub-samples for further lab bench analyses (Table 4).

TABLE 3

| Test | Flocculant | Gypsum Slurry | FFT | Centrifuge feed | Centrate | Cake |
|---|---|---|---|---|---|---|
| Wt % solids-field lab | | Daily/AR | Y | Y | Y | Y |
| Rheology | Daily/AR | | | AR | | AR |

TABLE 4

| Test | Dilution Water | FFT | Centrifuge feed | Centrate | Cake |
|---|---|---|---|---|---|
| OWS composition (Dean Stark) | | Y | Y | Y | Y |
| Methylene blue | | Y | Y | Y | Y |
| Coulter PSD | | Y | Y | Y | Y |
| XRD | | AR | AR | AR | AR |
| Water chemistry | AR | AR | AR | AR | AR |
| Microscopy | | | | | |
| Cold spin | | | | | |

Solids content was measured using moisture balances (a Mettler-Toledo unit using an IR heating element; a CEM unit using a microwave drying technique). Rheology of polymer solutions was determined using a Bohlin Visco 88 rheometer or a Fann constant RPM viscometer operated at 200 rpm. Centrifuge cake rheology was determined using a Haake Viscotester 550.

Oil/water/solids composition was determined using Dean & Stark procedure. Clay content was determined using XRD (Rigaku D/NAX Rapid-II rotating anode power diffractometer); methylene blue index; and sedigraph (Micrometrics Sedigraph III 5120). For water chemistry, the pH, bicarbonate and carbonate concentrations were determined with a PC-Titrate Alkalinity Autotitrator (Mandel); elemental analysis using a Varian Simultaneous Vista-Pro ICP-OES; and anions using a Dionex ICS 3000.

In addition, or, in the alternative, oil/water/solids content was determined with a Dean Stark soxhlet extraction technique with hot toluene. Large extractors were used for the centrate, and small extractors were used for the FFT, centrifuge feed, and cake. The particle size distributions of hydrocarbon free solids were measured with the Coulter Particle Analysis technique, using a Coulter LS 13 320 laser diffraction particle analyzer. The solids were cleaned using the Dean & Stark technique, and prepared for analysis using total dispersion protocols. The pH and conductivity were measured using a Jenway 4330 conductivity and pH meter. Anion content was determined by ion chromatography using a Dionex-DX 600 series chromatograph with an Ion-Pac AS4A-SC analytical column. An inductively coupled argon plasma atomic emission spectrometer (Varian Vista RL model ICP-AES) was used to measure 28 individual elements. Carbonate and bicarbonate content were measured using an alkalinity titration titrator (Metrohm Titrino Model 751).

i. Comparison of Maximum Experimental Centrifuge Rates with and without Gypsum

High throughput tests were performed using the Alfa Laval Lynx 1000 centrifuge (with rotating assembly #1 and rotating assembly #2) with and without gypsum (Table 5). A throughput of 41 dtph was achieved with rotating assembly #1 and a throughput of 54 dtph was achieved with rotating assembly #2, when no gypsum was added. Rotating assembly #1 achieved 67 dtph, and rotating assembly #2 achieved 73 dtph with the addition of gypsum. Gypsum addition to the FFT feed significantly improved Alfa Laval Lynx 1000 throughputs by yielding a significantly stronger, more conveyable cake.

TABLE 5

| Alfa Laval Lynx 1000 | Throughput (dtph) |
|---|---|
| Test results without gypsum, RA #1 | 41 |
| Test results without gypsum, RA #2 | 54 |
| Test results with gypsum, RA #1 | 67 |
| Test results with gypsum, RA #2 | 73 | ii. Characterization of FFT

Figure 2:
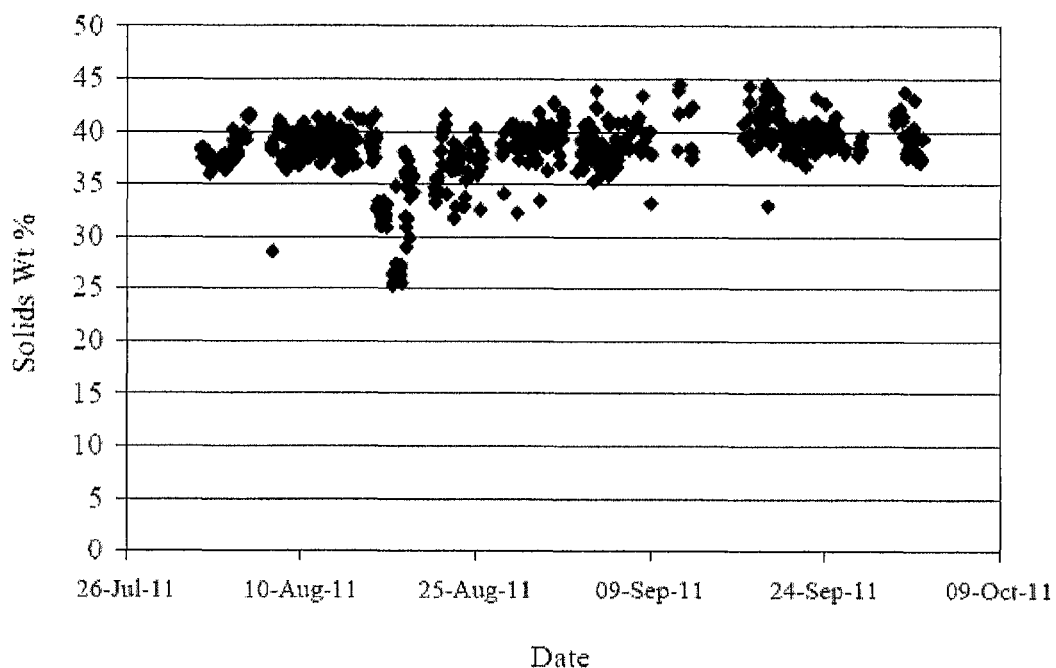
FIG. 2 is a graph showing the consistency in the solids content (wt %) of the fluid fine tailings from the dredge.

The solids content of FFT dredged from a particular tailings basin at various times during a two and a half month period is shown in FIG. 2. As can be seen from FIG. 2, the dredge consistently delivered FFT at 37-40 wt % solids.

Figure 3:
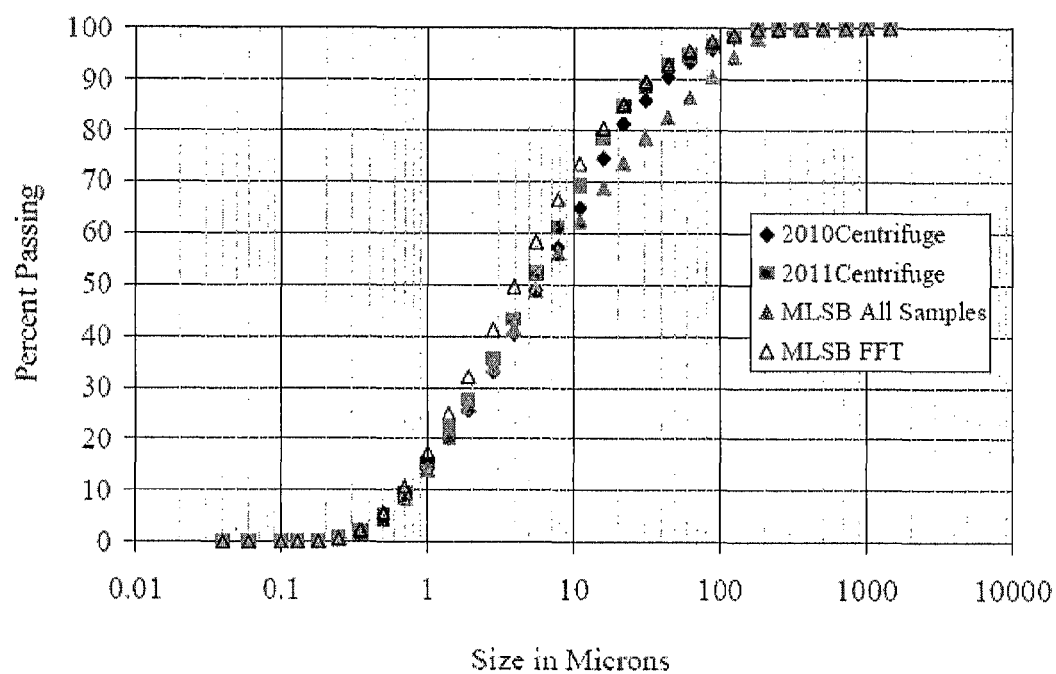
FIG. 3 is a graph showing the average mineral particle size distribution of four samples of fluid fine tailings.
Figure 4:
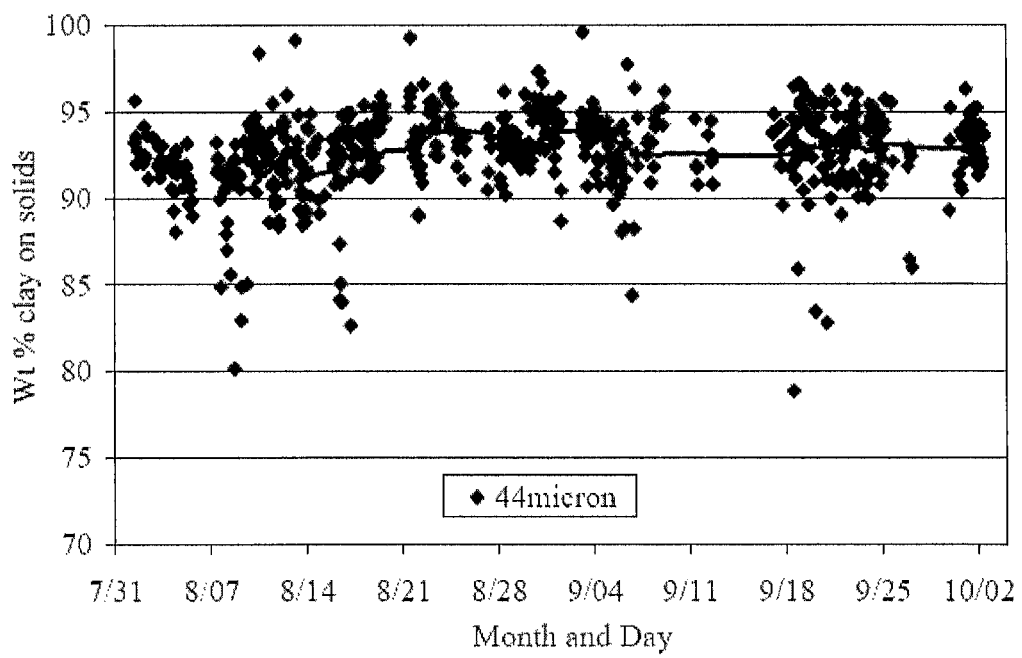
FIG. 4 is a graph showing the average 44 micron fraction in the fluid fine tailings.
Figure 5:
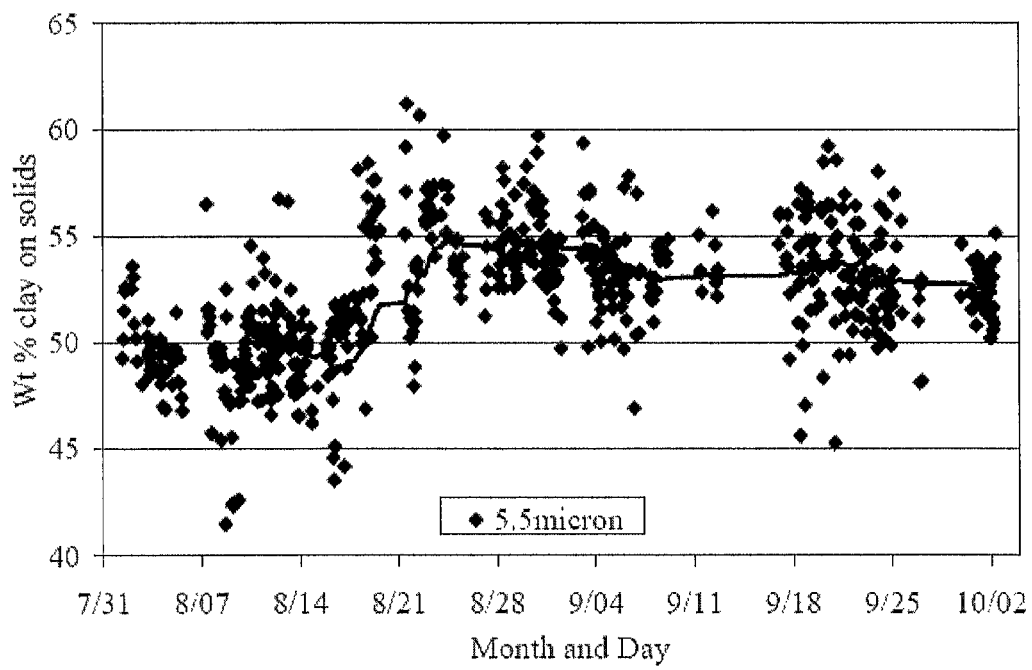
FIG. 5 is a graph showing the average 5.5 micron fraction in the fluid fine tailings.
Figure 6:
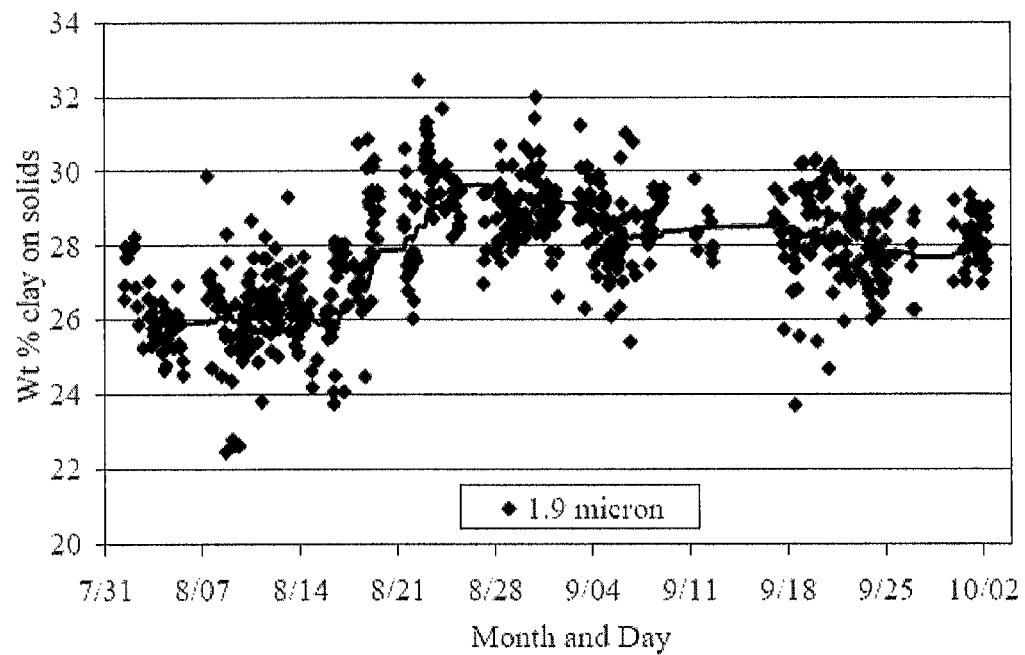
FIG. 6 is a graph showing the average 1.9 micron fraction in the fluid fine tailings.

Data for the average mineral particle size distribution of four different FFT samples are shown in FIG. 3. It has been found that the average mineral particle size distribution of FFT is fairly consistent from basin to basin. However, it is understood that variations in particle size distribution may occur from basin to basin and over time. FIGS. 4-6 show the changes in 44 micron, 5.5 micron, and 1.9 micron particles over about a two month period of time. The 44 micron portion of the solids content is very consistent, while the 5.5 and 1.9 micron fractions show more variations.

Figure 7:
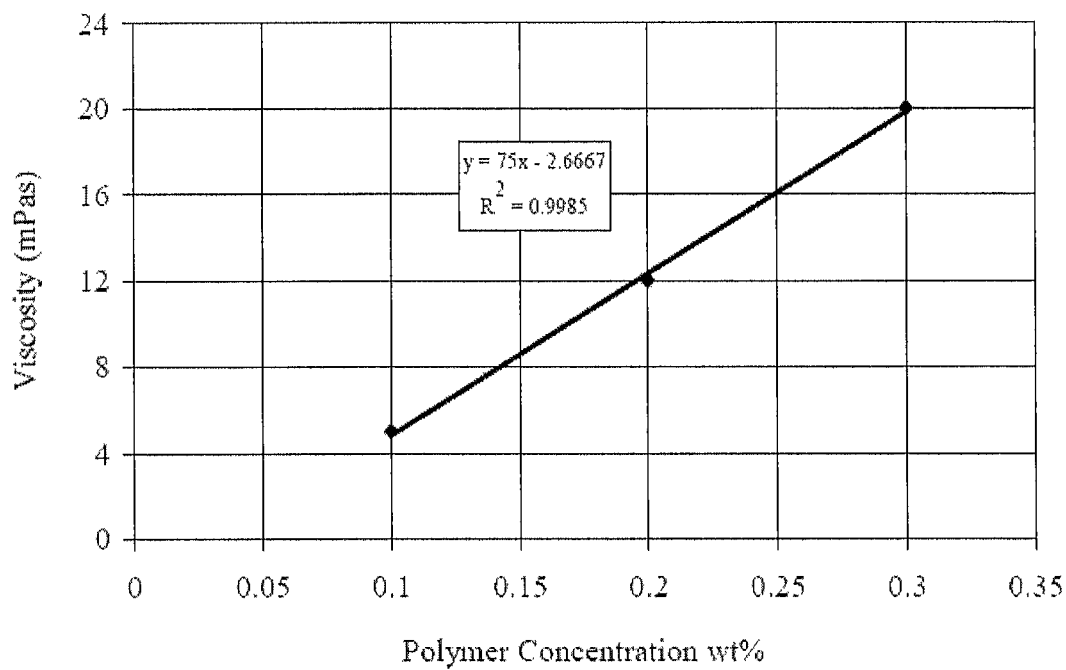
FIG. 7 is a graph showing the relationship between polymer viscosity and concentration for the flocculant at 18° C. using a simple constant rpm rheometer (Fann model at 200 rpm).

Tailings behavior may be attributed to clay minerals. Clay size (defined to be particles less than 2 microns in size) and clay minerals are strongly correlated. Methods for following trends in clay concentration include use of a hydrometer, sedigraph, methylene blue (MB) adsorption, laser light scattering methods, and direct quantification of clay minerals using x-ray diffraction (XRD). The sedigraph method is similar in principle to the hydrometer test, where the density of a clay suspension is monitored over time. As the coarse particles settle out, the fluid density decreases. This decrease can be related to the particle size distribution via stokes law and information about the fluid viscosity. The methylene blue test involves adsorption of the methylene blue dye on the clay surfaces and is best used to quantify differences in clay content. The methylene blue test can be conducted on bitumen free solids from a Dean Stark separation, or directly on the slurry suspension. XRD is useful in characterizing the clays as minerals. Table 6 summarizes particle size data for FFT samples using various methods for clay characterization.

storage tank was a conventional oil field tank, with polymer solution level maintained at about 40 m³ with stirring. Aside from polymer concentration, polymer effectiveness is affected by the degree of hydration, or the extent to which the polymer has uncoiled in solution. Both factors are related to viscosity which was used to monitor consistency in the polymer solution. A calibration of polymer viscosity as a function of solution concentration is shown in FIG. 7 for SNF Flopam 3338. The polymer viscosity follows the Arrhenius equation given by:

$$\eta = A e^{Ea/RT} \quad (1)$$

where $\eta$ is viscosity, A is a form factor, Ea is the activation energy for polymer uncoiling, R is the gas constant, and T

TABLE 6

| Wet sieve % Passing 45 μm | Solids % Solids | Stark MB % Clay | Slurry MB % Clay | CPA % Passing 44 μm | CPA % Passing 5.5 μm | CPA % Passing 1.9 μm | Sedigraph % Passing 44 μm | Sedigraph % Passing 2 μm | Dean XRD Clay % Clay |
|---|---|---|---|---|---|---|---|---|---|
| 91 | 39.6 | 64 | 62 | 91 | 49 | 26 | 97 | 53 | 55 |
| 90 | 38.3 | 62 | 64 | 90 | 50 | 28 | 98 | 54 | 62 |
| 90 | 33.6 | 62 | 59 | 95 | 51 | 28 | 96 | 50 | 48 |
| 92 | 35.0 | 63 | 63 | 92 | 51 | 27 | 97 | 52 | 49 |
| 91 | 40.7 | 58 | 55 | 93 | 49 | 26 | 95 | 47 | 48 |
| 96 | 33.4 | 60 | 62 | 94 | 52 | 28 | 96 | 52 | 55 |
| 93 | 34.1 | 61 | 61 | 94 | 51 | 28 | 97 | 52 | 58 |
| 91 | 40.9 | 60 | 56 | 85 | 44 | 24 | 96 | 46 | 53 |
| 96 | 37.2 | 75 | 66 | 94 | 55 | 29 | 99 | 60 | 51 |
| 97 | 40.9 | 78 | 65 | 94 | 57 | 30 | 99 | 60 | 67 |
| 96 | 37.8 | 69 | 68 | 95 | 58 | 30 | 99 | 60 | 53 |
| 98 | 26.4 | 61 | 57 | 91 | 47 | 24 | 98 | 53 | 55 |
| 96 | 36.8 | 71 | 68 | 95 | 57 | 29 | 98 | 58 | 57 |
| 98 | 27.5 | 69 | 61 | 93 | 50 | 26 | 98 | 54 | 53 |
| 98 | 36.7 | 70 | 67 | 96 | 60 | 32 | 99 | 60 | 65 |
| 98 | 42.1 | 74 | 76 | 93 | 53 | 29 | 98 | 57 | N/A |
| 100 | 39.5 | 76 | 70 | 91 | 52 | 28 | 98 | 59 | 55 |
| 94 | 40.3 | 67 | 69 | 94 | 53 | 29 | 97 | 52 | 62 |

The consistency in the FFT feed properties over the course of testing does not allow for an appreciation of the relationship between the various analytical options when one considers that each has an uncertainty of 5% or more, with the exception of X-ray diffraction where the uncertainty is 10% or more.

Given the strong correlations among the methods for clay determination, the CPA 5.5 micron size is preferred. The 1.9 micron size in a laser light scattering method such as CPA is more subject to experimental error due to difficulties in consistent sample dispersion, and lower signal to noise as the particle size decreases. FIG. 3 shows that on average, the clay content (using the CPA 1.9 or 5.5 micron) was higher for one set of tests compared to a second set of tests. This higher clay content results in higher than average flocculant consumption. Overall, the FFT had a 5.5 micron clay content ranging from 45-60%, averaging about 52%. FIG. 5 shows that the 5.5 micron clay content increased from 50% to 53% after dredge relocation.

iii. Flocculant Make Up and Characterization

Figure 8:
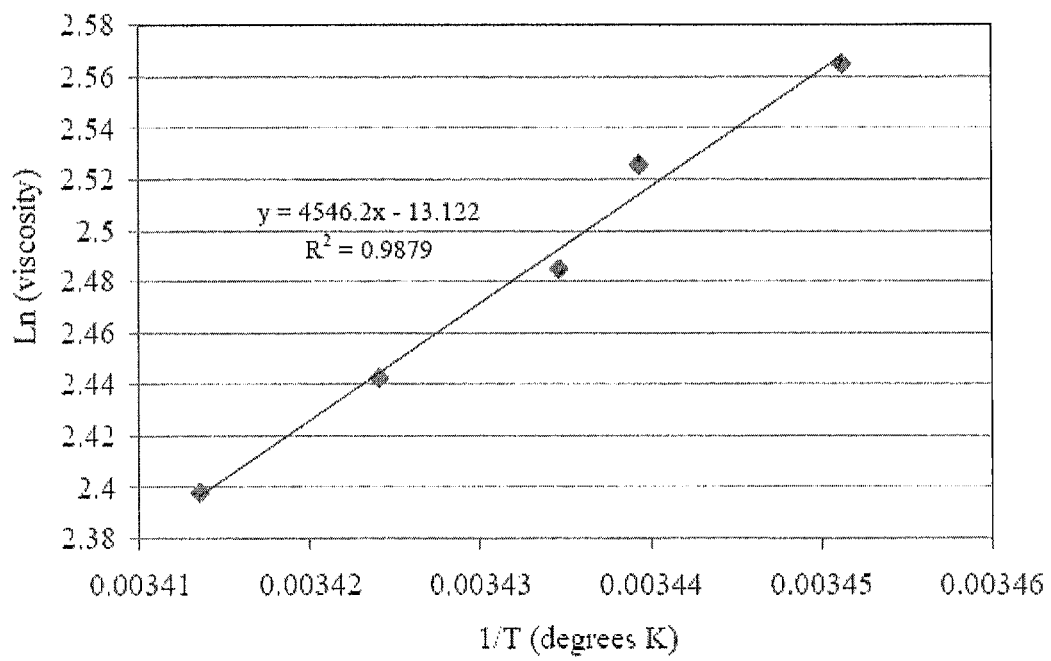
FIG. 8 is a graph showing the Arrhenius relationship for the 0.2% polymer solution.

The polymer preparation unit first adds water and slices the polymer beads to several microns to increase the surface area, thereby increasing the hydration rate for the polymer. This allows for efficient mixing of the mother liquor to the useable concentration. At high centrifuge feed rates, the hydration time for the polymer solution is only about 20 or 30 minutes. Inadequate polymer hydration means increased dosage requirements. Although there was no indication of this in the testing, hydration time needs to be maximized with other more viscous or less soluble polymers. The is temperature (degrees Kelvin). Using this approximation, variations in the polymer concentration can be estimated. Using the polymer and viscosity data, FIG. 8 shows the plot of ln (viscosity) versus 1/T (degrees Kelvin) for the 0.2% polymer solution. This relationship can then be used to determine a corrected viscosity by referring to the viscosity and concentration relationship established in FIG. 7.

Figure 9:
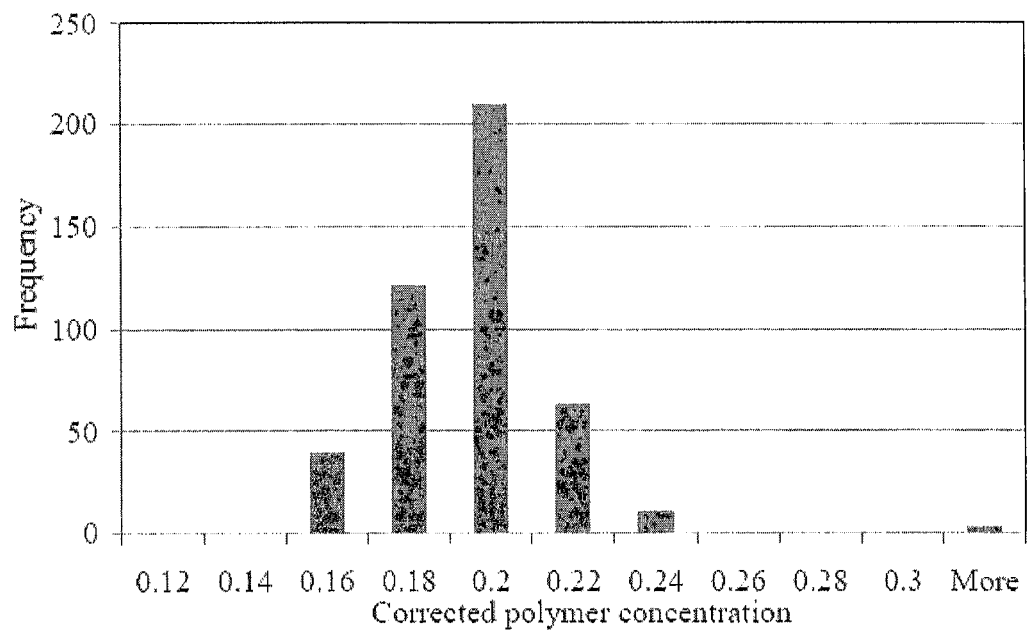
FIG. 9 is a histogram showing a summary of all the nominally 0.2% polymer tests indicating that most of the polymer is within 10% of the target concentration.
Figure 10:
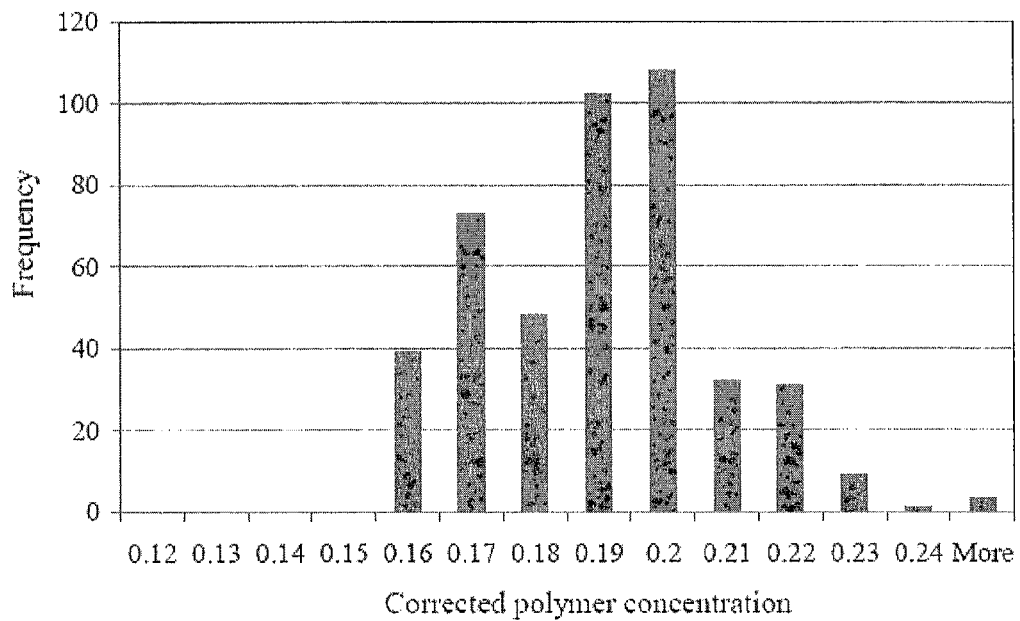
FIG. 10 is a histogram showing polymer concentrations with intercept corrected data bringing the average to 0.2%.
Figure 11:
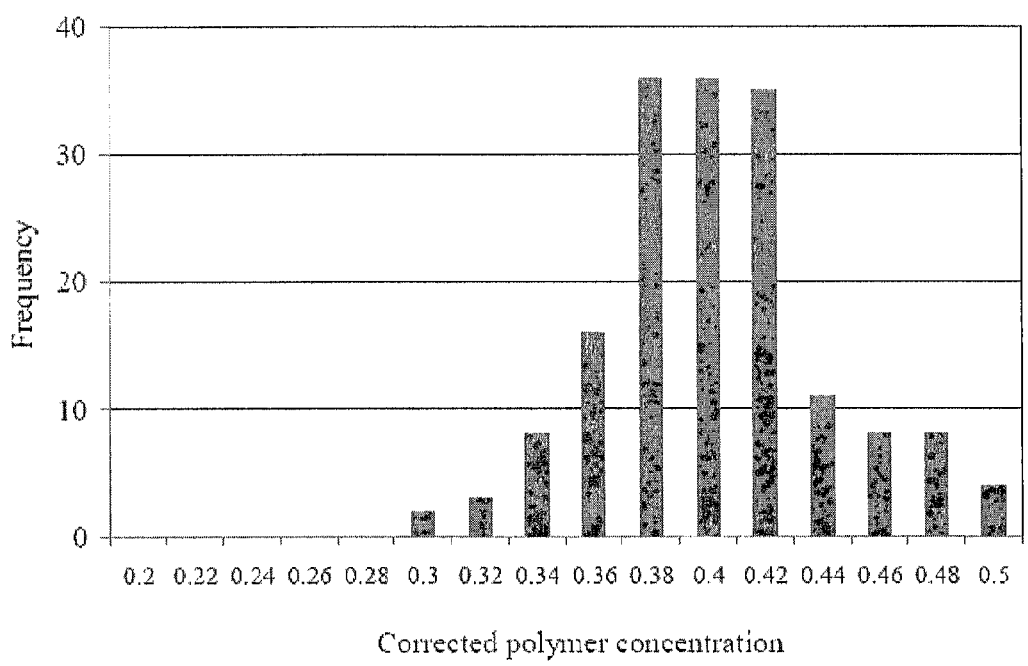
FIG. 11 is a histogram showing a summary of the temperature corrected 0.4% polymer concentrations using the slope from the 0.2% Arrhenius data with intercept corrected for a 0.4% average concentration.

Polymer concentrations of 0.2 and 0.4% were tested. FIG. 9 shows the histogram of polymer concentrations developed using the Arrhenius equation. 88% of the data points are within 10% of the target 0.2% polymer, and only 17% are more concentrated than 0.2%. The average polymer concentration is 0.19±0.03. This analysis is very sensitive to changes in slope or intercept. When the intercept is changed to bring the average polymer concentration to exactly 0.2% (a change in intercept from only 13.12 to 13.04), the histogram does not change significantly (FIG. 10). FIG. 11 shows the histogram for the 0.4% polymer, using the same slope (activation energy) as determined from the 0.2% polymer data, but a slope fitted to a 0.4% polymer concentration. The histogram shows 0.4%±0.06 polymer. The increased in variability for the 0.4% polymer might be due to difficulties in maintaining proper mixing or hydration at this higher polymer concentration. However, the viscosity method is useful due to variations in suspended solids in the polymer make-up water, and the dilution water having almost 1500 ppm dissolved salts (0.15%).

iv. Polymer Hydration

Polymer hydration is the degree to which the polymer molecules have uncoiled or effectively gone into solution.

Viscosity changes over time may be used to evaluate polymer hydration. Prior to use, the polymer was stored in tanks with stirring which may have helped hydrate the polymer or break up the polymer strands in solution, resulting in viscosity changes. To ensure proper polymer hydration, a sample was taken from the polymer solution in the storage tank and the viscosity determined. Gentle or aggressive stirring for several minutes showed no change in polymer viscosity, confirming that the polymer was completely hydrated. During testing, the polymer make up was not keeping pace with demand, and testing commenced using 0.4% rather than 0.2% polymer solution. The move to more concentrated polymer solutions corresponded with the maximum centrifuge throughputs. At high throughputs, about 20 m³/h of the 0.4% flocculant solution was required. This increase in concentration had the effect of increasing the hydration time in the storage tank.

v. Fines Capture

A fines capture target of 95% is considered to be a minimum performance requirement to limit re-handling. Fines capture is largely determined by the loss of solids in the centrate. In the field, solids content determinations (e.g., bitumen, total dissolved solids, particle size distribution) may help guide performance. Understanding the particle size distributions in a centrifuge operation is important because of the possibility of separating ultra fines from the FFT. These would generally be the particles less than 1 micron in size and if they are concentrated in the centrate, there is a potential for them to create tailings handling issues far in excess of their mass fraction. This is not an issue with flocculated FFT. The operating criteria for the field solids capture was set at 97%. Solids capture was the primary metric used to determine centrifuge performance in the field as determined by the following equation where X is weight percent and ρ is density:

$$X \ Capture = \frac{X_{feed} \cdot \rho_{feed} - X_{centrate} \cdot \rho_{centrate}}{X_{cake} \cdot \rho_{cake} - X_{centrate} \cdot \rho_{centrate}} \cdot \frac{X_{cake} \cdot \rho_{cake}}{X_{feed} \cdot \rho_{feed}} \quad (2)$$

Figure 12:
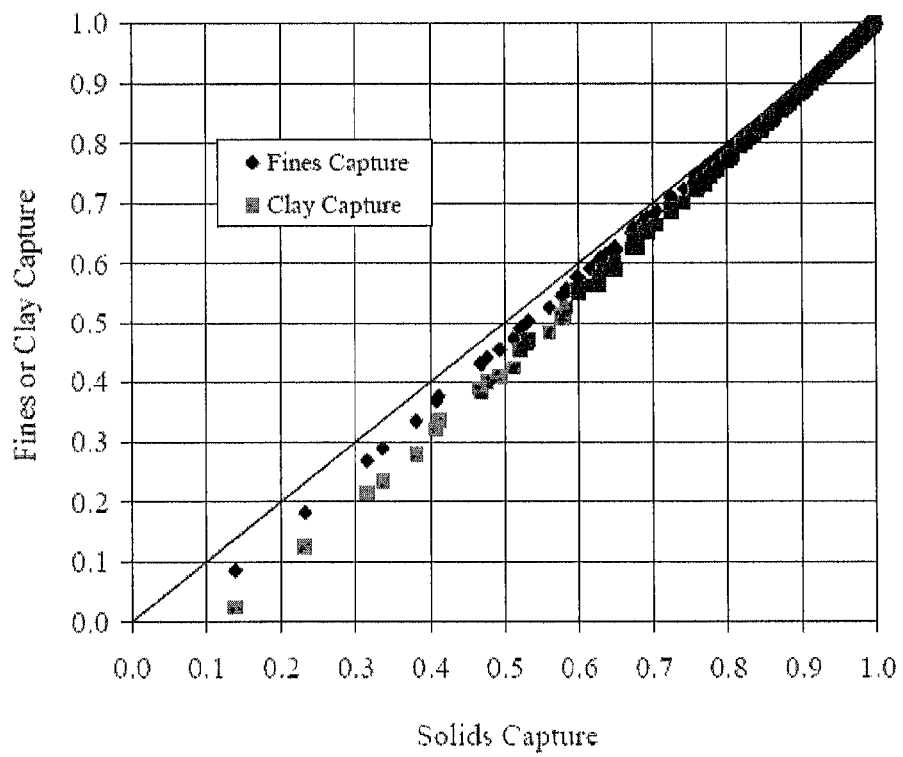
FIG. 12 is a graph comparing the fines and clay capture to solids capture for all the experimental runs.
Figure 13:
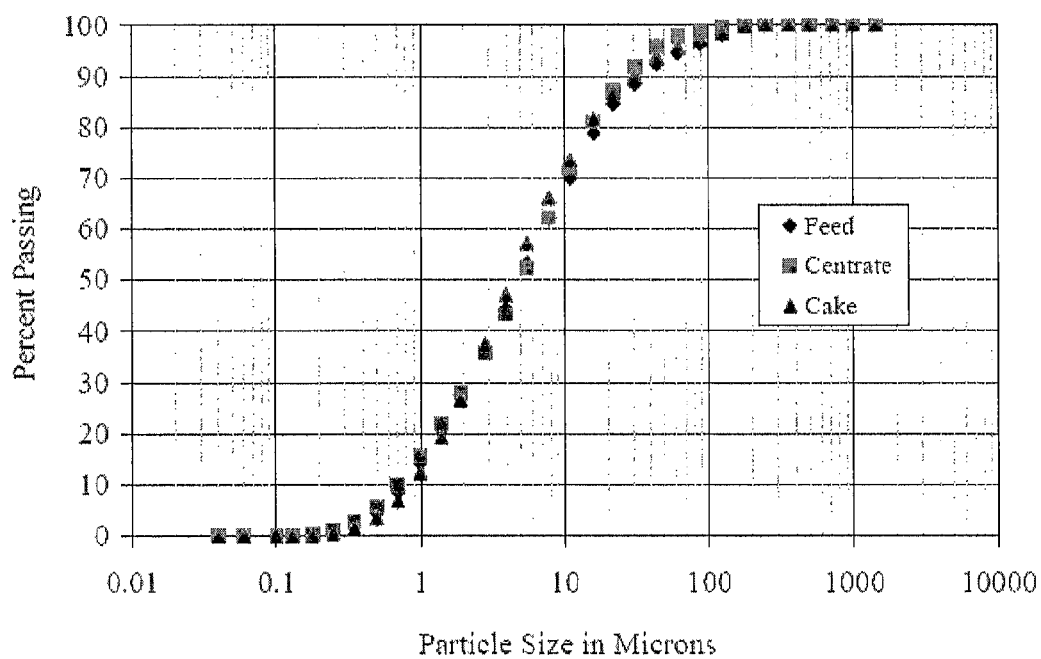
FIG. 13 is a graph showing the results of Coulter particle size analysis for centrifuge feed, centrate, and cake samples over the entire testing.

FIG. 12 shows all of the field data for solids capture compared to the fines capture (from the laboratory analysis of PSD), and to a clay capture determined from the average clay content of the various samples. There is a relatively low sand content in the FFT feed since the total solids capture and the fines capture are almost directly correlated. Similarly, at the target fines capture region >95%, the clay capture is also essentially the same as the solids capture, indicating that there is no segregation of the ultrafine solids to the centrate stream. FIG. 13 shows that ultrafines separation does not occur with flocculated centrifuge feed, by showing a comparison of the size particle distributions for the feed, cake and centrate. Within experimental uncertainties, these three streams have similar particle size distributions.

Figure 14:
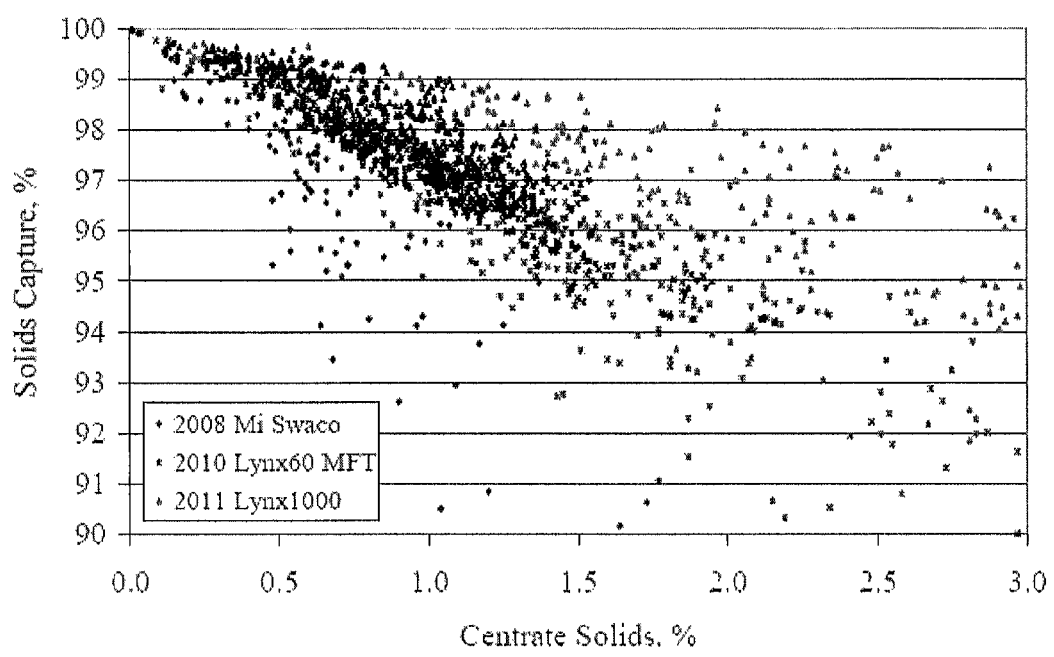
FIG. 14 is a graph showing the relationship between centrate solids and solids capture for the three pilot tests.

Centrate quality (suspended solids wt %) tends to define the solids or fines capture. FIG. 14 compares centrate solids to solids capture for three separate pilot programs over four years. As testing progressed, fewer test runs lead to off specification or less than 95% capture, and as throughput increases (i.e., successively larger capacity machines were tested), higher solids in the centrate will still result in acceptable overall fines or solids capture.

vi. Centrate Quality

Centrate can be recycled and used to control centrifuge feed density via a dilution circuit, and may be used for polymer make up. Since polymer make up requires slicing the polymer beads into a high surface area, any solids contamination in the preparation water could have a deleterious effect on equipment reliability. FFT or FFT dilution, however, does not require high quality water. FIG. 14 indicates that the majority of the centrate samples contained less than 1% solids which was within an acceptable range for recycle water in the pond and centrifuge feed dilution.

vii. Centrate Settling and High Flow Rate Testing

The nominal capacity of a centrifuge depends upon the settling or separation behavior of the feed. In FFT applications, the efficiency of the separation depends upon how efficiently the polymer contacts the suspension solids. The optimum polymer injection point was found to be as close to the centrifuge as possible, implying that the polymer mixing is sensitive to overshear conditions which might occur when polymer is injected prior to flow meters and piping bends. If polymer mixing is occurring exclusively in the centrifuge, there may be high flow rates that overmix the polymer and FFT. It has been previously demonstrated that centrifuge throughput is limited by lack of scroll or back drive capacity. There might be a flow rate where overmixing prevents efficient separation, even with back drive capacity.

Figure 15:
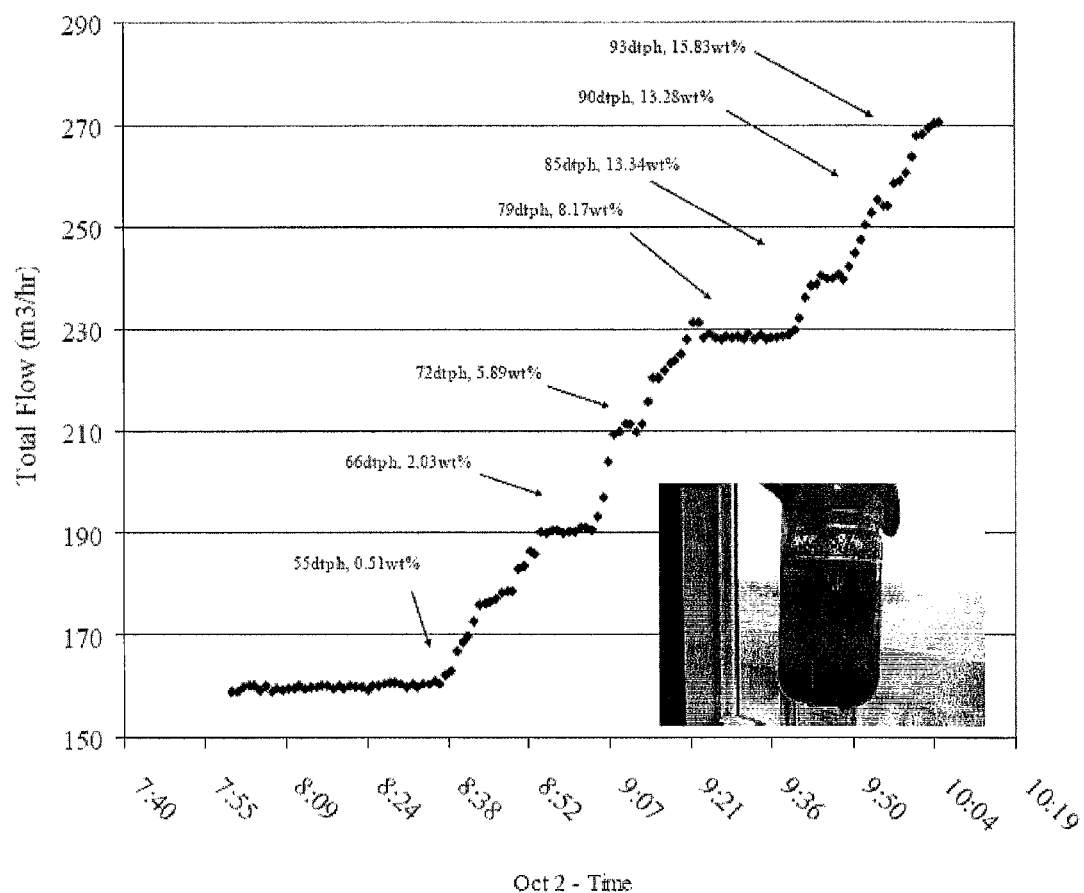
FIG. 15 is a graph showing centrate solids content as a function of throughput during the high capacity test, with the inset showing the rapidly settling centrate.

High flow rate runs were conducted to assess if overmixing might make increased back drive capacity of little or no benefit. FIG. 15 shows this increasing flow rate experiment and the subsequent centrate solids at those flow rates. As the flow rate or tonnes of solids throughput increases, the centrate quality decreases. Even at the highest flow rates, no unusual vibrations, bearing heating, or fluid leakages were noted. Table 10 shows the 24 hour settling behavior of the centrates collected during this high volume test. Overshear or overmixing of the polymer and FFT mixture was observed at the very highest throughput of 270 m³/h or 98 dtph, since after 24 h of settling, a significant proportion of the centrate solids remained in suspension. At the lower rates, the centrifuge feed is well flocculated and settles rapidly, but simply not efficiently removed from the centrifuge. This indicates that with properly mixed centrifuge feed, the consequences of some off specification centrifuge performance will be minimal. These results also confirm that increased back drive capacity can provide significant improvement in centrifuge throughput.

TABLE 7

| Throughput (dry tonnes per hour) | Total Flow (m³/h) | Centrate Solids (%) | % Solids in supernatant after 24 h of centrate settling |
|---|---|---|---|
| 55 | 160 | 0.51 | On spec |
| 66 | 190 | 2.03 | 0.28 |
| 72 | 210 | 5.89 | 0.36 |
| 79 | 228 | 8.17 | 0.25 |
| 85 | 245 | 13.34 | 0.37 |
| 90 | 258 | 13.28 | 0.23 |
| 98 | 271 | 15.83 | 2.10 | viii. Cake Quality

Cake properties are a function of the solids content and water chemistry. The importance of gypsum addition in improving conveyability of the cake from the centrifuge is generally reflected in the strength of the cake product. There is a definite relationship between gypsum addition and centrifuge cake strength. The field laboratory used a Haake viscometer to measure cake yield point. Table 11 summarizes the effect of gypsum with an average of the gypsum and non-gypsum data. For the same average solids content, the gypsum cake is considerably stronger.

TABLE 8

| Gypsum Dose (g/tonne) | Cake Yield (Pa) | Solids (wt %) |
|---|---|---|
| 0 | 1095 | 51.1 |
| 1791 | 1289 | 51.1 | ix. Polymer Dose, Clay Content, and Centrifuge Performance

Figure 16:
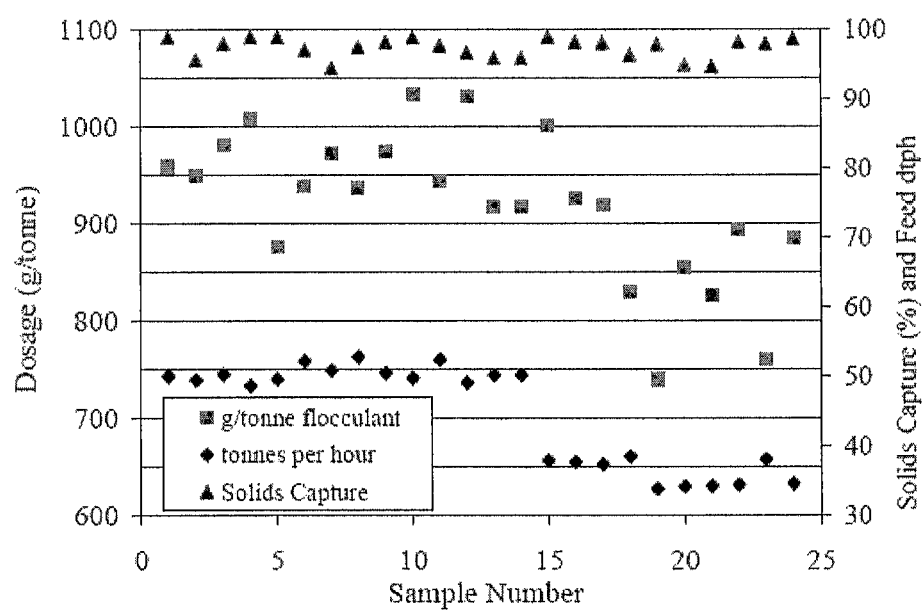
FIG. 16 is a graph showing the solids capture (%) in a 24 hour low polymer dosage test.
Figure 17:
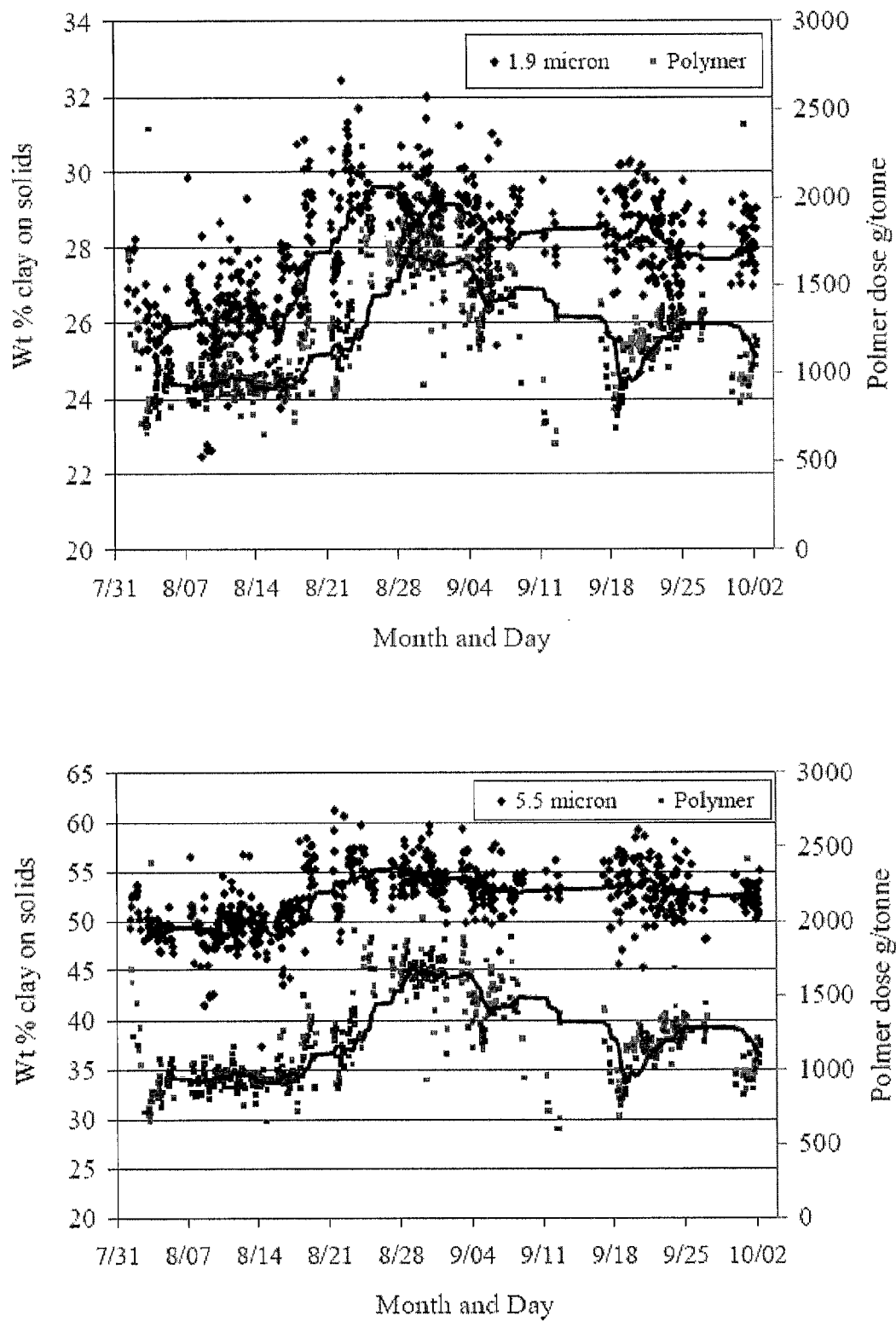
FIG. 17 illustrates two graphs showing the general trend between polymer dosage and clay content for 1.9 micron clay particles (A) and 5.5 micron clay particles (B).

Testing was conducted to assess flocculant dosages. FIG. 16 shows low flocculant testing, all with on specification fines capture, and the relationship between throughput and flocculant dosage. During the initial part of the test, the average dosage was 962 g/tonne at 50 dtph. In the latter stages, polymer consumption was 848 g/tonne at 36 tph throughput. These results indicate that mixing was probably more optimum, possibly because the polymer injection could be located close to the centrifuge, eliminating feed tube problems. Coupled with the average higher clay content, polymer dosage is likely close to an optimum. At higher throughputs, polymer dosage is higher for various reasons. High gypsum dosages increases polymer requirements. At higher than predicted throughputs, the polymer effectiveness may also have been reduced due to lower residence times in the hydration tank. Higher than expected tonnage throughput might also require the higher cake strength which is associated with higher polymer dosage. It is important to note, however, that there was no explicit effort to demonstrate lowest possible flocculant dosage at the highest tonnages.

FIG. 21 shows the relationship between changes in clay content (both 1.9 and 5.5 micron) and polymer dosage. Higher clay content requires an increase in polymer dosage. With further mixing optimization and low polymer dose testing, the increase in flocculant dosage with increased clay content is less obvious towards the end of the test program.

In one embodiment, the centrifuge cake is further treated with an additive to give additional strength to the cake. Examples of additives useful in the present invention include Portland cement, fly ash, overburden, gypsum and lime.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A process for dewatering fluid fine tailings, comprising:
   a) providing a fluid fine tailings feed having a solids content in a range of about 10 wt % to about 45 wt %;
   b) adding an pre-centrifuge additive consisting of a coagulant selected from the group consisting of gypsum, alum and lime, and a flocculant, the coagulant being added to the fluid fine tailings feed and mixed to form a coagulant-treated tailings feed and the flocculant being added to the coagulant-treated tailings feed and mixed to form flocs and produce a flocculated tailings feed; and
   c) feeding the flocculated tailings feed to at least one centrifuge and centrifuging the flocculated tailings feed to produce a centrifuge centrate having a solids content of less than about 3 wt % and a centrifuge cake having a solids content of at least about 50 wt %;
   whereby the addition of coagulant prior to the addition of flocculant increases the throughput of flocculated tailings through the centrifuge.

2. The process of claim 1, wherein the coagulant and the fluid fine tailings feed are mixed in an agitated feed tank to cause the solids to agglomerate.

3. The process of claim 1, wherein the coagulant is added to the fluid fine tailings feed in-line.

4. The process of claim 1, further comprising diluting the coagulant with water prior to adding it to the fluid fine tailings feed.

5. The process of claim 1, wherein the dosage of coagulant ranges from about 300 grams to about 1,500 grams per tonne of solids in the fluid fine tailings feed.

6. The process of claim 1, wherein the coagulant comprises gypsum.

7. The process of claim 1, wherein the solids content of the fluid fine tailings feed is in a range of about 30 wt % to about 45 wt %.

8. The process of claim 1, wherein in step (b), the flocculant and coagulant-treated tailings feed are mixed in a static mixer having no moving parts or a dynamic mixer having at least one moving part.

9. The process of claim 8, wherein the flocculant and coagulant-treated tailings feed are mixed in a static mixer having no moving parts.

10. The process of claim 9, wherein the static mixer having no moving parts is a T mixer.

11. The process of claim 8, wherein the flocculant and coagulant-treated tailings feed are mixed in a dynamic mixer having at least one moving part.

12. The process of claim 11, wherein the flocculant is added to the coagulant-treated tailings feed in-line prior to mixing in the dynamic mixer having at least one moving part.

13. The process of claim 1, further comprising diluting the flocculant prior to adding it to the coagulant-treated tailings feed.

14. The process of claim 13, wherein the flocculant is a 0.2 to 2% by weight aqueous solution.

15. The process of claim 13, wherein the flocculant is a 0.2 to 0.4% by weight aqueous solution.

16. The process of claim 1, wherein the flocculant is an anionic, nonionic, cationic or amphoteric polymer.

17. The process of claim 16, wherein the dosage of flocculant ranges from about 400 grams to about 2000 grams per tonne of solids in the fluid fine tailings feed.

18. The process of claim 16, wherein the flocculant comprises a polyacrylamide anionic flocculant.

19. The process of claim 1, wherein in step (b), the flocculant is added to and mixed with the coagulant-treated tailings feed in a centrifuge.

20. The process of claim 1, wherein the flocculated tailings feed is centrifuged in a solid bowl decanter centrifuge.

21. The process of claim 1, wherein the fluid fine tailings are optionally diluted with dilution water to produce the fluid fine tailings feed having a solids content in the range of about 10 wt % to about 45 wt %.

22. The process of claim 21, wherein after step (c), the centrifuge centrate is returned to a tailings pond or recycled as dilution water.

23. The process of claim 1, wherein after step (c), the centrifuge cake is disposed in an area using a dry stacking mode of disposal.

24. The process of claim 1, wherein the fluid fine tailings are mature fine tailings (MFT).

25. The process as claimed in claim 1, wherein the process is performed at ambient temperature.

26. The process as claimed in claim 1, further comprising:
   (e) dewatering the centrifuge cake by consolidation, drying and/or desiccation using 1 to 2 meter lifts.

27. The process as claimed in claim 1, further comprising:
   (e) dewatering the centrifuge cake by consolidation, drying and/or desiccation using greater than 2 meter lifts.

28. The process as claimed in claim 1, further comprising:
   (e) adding a cake strengthening additive to the centrifuge cake.

29. The process as claimed in claim 28, wherein the cake strengthening additive is selected from the group consisting of Portland cement, fly ash, overburden, gypsum and lime.

30. The process as claimed in claim 1, wherein the flocculant is a water soluble polymer having a molecular weight ranging between about 1,000 kD to about 50,000 kD and an intrinsic viscosity of at least 3 dl/g.

31. The process as claimed in claim 1, wherein the coagulant comprises gypsum and the flocculant comprises a polyacrylamide anionic flocculant.

* * * * *